United States Patent Office 3,184,384
Patented May 18, 1965

3,184,384
METHOD OF PRODUCING *BRUCELLA ABORTUS* VACCINE
Joseph W. Whalen, Zionsville, Ind., assignor to The Dow Chemical Company, Midland, Mich., a corporation of Delaware
No Drawing. Filed Sept. 7, 1961, Ser. No. 136,453
6 Claims. (Cl. 167—78)

This invention is concerned with a method for preparing *Brucella abortus* vaccine and with an improved stabilized vaccine composition.

For a number of years, strain 19 of the *Brucella abortus* organism has been employed for the preparation of vaccines useful for the immunization of cattle against attack by virulent Brucella infections. In order to obtain proper immunization, large numbers of the live strain 19 organisms must be injected. In the preparation of such vaccines, the presence of appreciable numbers of dead or dissociated Brucella organisms is highly undesirable. It is also necessary to maintain culture conditions so that both virulent and non-immunogenic variants of the desired strain 19 organism are avoided. Dissociation has been a particular problem in prior attempts to culture *Brucella abortus* in liquid media.

In the past, the only approved method for the production of strain 19 Brucella vaccines has involved culturing the Brucella organisms in a container such as a Roux flask or Povitsky bottle on a conventional solid potato-glycerol agar medium. In such cultures it has been essential, in order to obtain the required yield of undissociated organisms, to avoid contact of liquids, such as the condensate which normally forms in such bottles, with the growing bacterial colonies. The preparation of vaccine in such manner requires the pooling of the washings from the agar medium in a large number of such bottles, with attendant danger of contamination inherent in the number of operations required.

Recently, the culture of *Brucella abortus* in liquid medium for the production of vaccine has been reported by Sterne, J. Gen. Microbiol. 18, 747–750 (1958) and by Van Drimmelen, Onderstepoort Journal of Veterinary Research, vol. 27, No. 4, December 1958. However, it has not been found possible to produce desirable numbers of *Brucella abortus* organisms in a short time by the methods disclosed by Sterne and Van Drimmelen. Also, it has been difficult to produce high yields of undissociated organisms by said methods.

It is an object of the present invention to provide a method for producing a vaccine concentrate of *Brucella abortus* strain 19 of high potency. It is a further object to produce such vaccines having enhanced stability. Other objects will become apaprent from the following specification and claims.

In accordance with the present invention, it has been discovered that by the use of a particular liquid nutrient medium and cultural procedure, as hereinafter described, the organisms of *Brucella abortus* strain 19 can be rapidly reproduced in said medium to provide a vaccine concentrate of high potency. It has further been discovered that by the incorporation in said liquid culture medium of a particular stabilizer system, both liquid and desiccated vaccines of unexpected stability are obtained.

In carrying out the invention, the liquid culture medium is prepared by dissolving a particular mixture of amino acids and peptides in water together with glucose, yeast extract, sodium chloride, thiamine hydrochloride and an antifoam agent, preferably a polypropylene glycol. This medium is sterilized, preferably by filtration, and is then inoculated with seed obtained by washing of smooth colonies of *Brucella abortus* strain 19, propagated in conventional fashion on solid potato-glycerol agar medium.

The incubation of the Brucella organisms is carried out in a suitable vessel, such as a glass, glass-lined or stainless steel fermentor tank, equipped with a high-speed agitator and a sparger for introducing sterile air. Incubation of the organisms is carried out with vigorous agitation at a temperature of 36° to 38° C., while introducing sterile air at the rate of at least 7 volumes of air per minute for each 10 volumes of liquid culture medium. Culture of the organisms under the foregoing conditions is continued for a period of about 20 hours for a single stage or up to about 40 hours when additional liquid medium is supplied as hereinafter described. In any case, the incubation is continued for a sufficient period to obtain optimal growth of viable organisms, and the resulting vaccine concentrate is thereafter harvested by withdrawing it from the fermentor under pressure into a sterilized, stainless steel holding tank or into sterile glass bottles. The bulk vaccine concentrate may thereafter be mixed with buffered physiological saline solution or other suitable diluent to prepare an injectable fluid vaccine product, or the concentrate may be combined with a stabilizer and desiccated by freeze-drying in conventional fashion to prepare a desiccated product suitable for subsequent reconstitution with physiological saline solution to produce an injectable vaccine.

The particular mixture of amino acids and peptides, found to be essential as a constituent of the nutrient medium employed herein for obtaining high yields of Brucella organisms, is a pancreatic enzyme hydrolysate of casein containing, in the form of mixed amino acids and peptides, all of the amino acids originally present in casein. With casein as normally derived from natural sources, said mixture also contains an appreciable portion of the vitamins required for proper growth of the Brucella organisms. Commercially available pancreatic enzyme hydrolysate of casein, suitable for use in accordance with the invention, is available under the name of N-Z-Amine, Type A, from the Sheffield Chemical Company. A representative analysis of the latter product is as follows.

| | Percent |
|---|---|
| Total nitrogen | 12.8 |
| Amino nitrogen | 6.8 |
| Percent Amino N to total nitrogen | 53.0 |
| Moisture | 3.1 |
| Lactose, maximum | 1.5 |
| Ash | 5.2 | pH (2% solution in water, 25° C.), 6.6.

Amino acid content (moisture-free basis):

| | |
|---|---|
| Lysine | 7.6 |
| Isoleucine | 6.4 |
| Leucine | 10.5 |
| Valine | 7.0 |
| Arginine | 3.3 |
| Threonine | 4.0 |
| Methionine | 2.5 |
| Cystine | 0.3 |
| Phenylalanine | 4.5 |
| Histidine | 2.4 |
| Tryptophane | 0.9 |
| Glutamic acid | 20.4 |

Vitamin content: Micrograms per gram

| | |
|---|---|
| Riboflavin | 4.25 |
| Thiamine | 0.11 |
| Niacin | 4.50 |
| Pantothenic acid | 2.19 |
| Biotin | 0.51 |
| Pyridoxin | 1.29 |

The choice of antifoam agent also appears to be important for obtaining desirably high rates of production and high yields of the Brucella organisms. Thus, for example, the use of conventional antifoam agents such as corn oil, a commercial silicone antifoam agent (Dow-Corning Anti-Foam A) or the polyoxyethylene derivative of ricinoleic acid employed by Van Drimmelen, while effective for inhibiting foam during the incubation process, produced vaccine concentrates of lower titer than did media embodying the preferred polyglycol antifoam agent. This preferred agent is a polypropylene glycol having a molecular weight of from about 1,500 to 3,000, advantageously about 2,000.

The composition of the liquid nutrient medium is critical for obtaining the desired high yields of live organisms. In general, optimal growth of the Brucella organisms has been obtained with a medium of substantially the following composition.

| Ingredient: | Percent by weight |
|---|---|
| Pancreatic hydrolysate of casein | 3 |
| Glucose | 2 |
| Thiamin hydrochloride | 0.0005 |
| Yeast extract | 1 |
| Sodium chloride | 0.5 |
| Polypropylene glycol (molecular weight: 2000) | 0.0116 |
| Demineralized water to make 100.00. | |

If desired, the polypropylene gycol antifoam agent can be incorporated into the inoculum seed suspension in amount to provide the foregoing concentration when said seed suspension is mixed with the liquid nutrient from which the polyglycol has been omitted. It will be apparent to those skilled in the art that minor variations in the above amounts and proportions may be made without departing from the essence of the invention. Any substantial departure from such composition, however, results in poor yields of vaccine or undesirable production of dead or disassociated organisms.

The foregoing proportions of ingredients produce a nutrient medium having a pH of about 6.3 to 6.4. During the incubation of the Brucella organisms in said medium, the pH normally rises to a value of 8.1 to 8.3. In general, the culture medium is maintained in this desired range without further additaments. If, however, the pH of the medium rises above the foregoing limits before the desired amount of reproductive growth of the organisms is attained, small amounts of sterile aqueous 50 percent glucose solution can be added to the medium to maintain the pH in the desired range.

It has further been found that aeration of the growth medium during the incubation of the Brucella organisms by passing air into the upper part of the fermentor and relying on the mixing action of the agitator for introducing air into the medium, does not provide for the rapid growth of the organisms as embodied in the present invention. Accordingly, it has been found essential to introduce sterile air into the lower portion of the fermentor tank below the surface of the nutrient mixture by means of a sparger, or other suitable distribution device, at the rate of at least about 7 parts by volume of air per minute for each 10 parts by volume of culture medium.

In practice, the agitation of the nutrient liquid and the rapid growth processes of the organisms during the incubation period produce heat so that cooling of the culture is usually required during at least part of the active growth period. Further, it is generally desirable to carry out the multiplication of the organisms in two or more stages. Conveniently, the seed inoculum harvested from the potato-glycerol agar into phosphate-buffered physiological saline solution is assayed and tested for purity before use. The seed inoculum is then introduced into a volume of the sterile liquid nutrient medium, as set forth above, in proportions of about 1 volume of inoculum to at least about 14 volumes of said medium, and the resulting mixture is incubated under the above-described conditions for a preliminary period of about 20 hours to produce a working seed culture. In such operations, the number of bottles of inoculum harvested and pooled is adjusted to provide a sufficient concentration of Brucella organisms in the seed inoculum to furnish an initial concentration of at least about $6 \times 10^8$ organisms per milliliter in the liquid nutrient medium, after admixing the inoculum therewith. On completion of said preliminary culture period, and while vigorous multiplication of the Brucella organisms is still proceeding in the working seed culture, a volume of fresh, sterile liquid nutrient medium in amount equal to or up to twice the volume of the working seed culture is run into the fermentor, and the incubation is then continued under the same conditions for a further period of from about 15 to 20 hours to complete the production of the desired vaccine concentrate.

The following examples illustrate the invention but are not to be construed as limiting the same.

*Example 1*

Brucella abortus organisms of strain 19 were inoculated onto potato-glycerol agar contained in Povitsky bottles and incubated in conventional fashion. After incubation for 48 hours at 36°–38° C., the organisms were harvested from 15 to 20 such bottles by washing with physiological saline solution containing a phosphate buffer system to maintain a pH of 6.4 and the washings were pooled, assayed and tested for purity. The volume of washings and number of bottles harvested was adjusted to provide an inoculum seed pool containing at least about $75 \times 10^{11}$ viable Brucella organisms. Meanwhile, a fluid medium was prepared as follows:

| | Percent |
|---|---|
| Pancreatic hydrolysate of casein [1] | 3 |
| Glucose | 2 |
| Thiamine hydrochloride | 0.0005 |
| Yeast extract | 1 |
| Nacl | 0.5 |
| Polyglycol P–2000 [2] | 0.0116 |
| Water | 93.4 |

[1] N–Z-Amine, Type A (Sheffield Chemical Co.).
[2] A polypropylene glycol having a molecular weight of about 2000.

125 liters of the foregoing composition were passed through a bacteriological filter of the Seitz type into a sterilized, stainless steel fermentor tank equipped with a sparger and motor-driven agitator and maintained at a temperature of about 37° C. The inoculum seed harvested as set forth above was then added to the fluid medium with agitation to provide an initial charge containing from about $0.6 \times 10^9$ to $1.5 \times 10^9$ organisms per milliliter, and the resulting mixture was incubated at temperatures of 36°–38° C. with the agitator operating at 240 to 250 revolutions per minute about 20 hours. During the above incubation period, sterile air was sparged into the lower part of the medium at a rate of about 7.1 liters per minute for each 10 liters of said medium, and the temperature was maintained in the above range by heating or cooling as required. On completion of the incubation of this working seed batch, a further 175 liters of the above-described fluid medium was sterilized by filtration and passed into the fermentor tank. Incubation under the foregoing conditions was then continued for about 18 more hours, after which the resulting bulk vaccine concentrate was harvested by drawing off into a sterilized, stainless steel holding tank and preserved by chilling to a temperature of 5° C. Serial dilutions of an aliquot of this concentrate were made with sterile aqueous 1 percent peptone solution and suitable dilutions plated in Petri dishes on sterile potato agar containing horse serum and incubated for 120 hours at 36°–38° C. Plate counts showed that the bulk vaccine concentrate contained about $200 \times 10^9$ viable Brucella abortus organisms per milliliter. Other similar serial dilutions were plated on sterile potato agar without horse serum, incubated and observed for dissociation by the method described by Mingle and Manthei in American Journal of Veterinary Research, 2 (3), 181–190 (1941). The vaccine concentrate was found to be substantially free of dissociated forms. Further batches of vaccine concentrate prepared by the above procedure gave consistent yields of $150 \times 10^9$ to $220 \times 10^9$ Brucella abortus organisms per milliliter.

Both liquid and desiccated vaccines produced from vaccine concentrates prepared according to the method of Example 1, have shown excellent stability in storage and have been employed routinely for a number of months for the immunization of calves with no reported breaks in immunity thereafter.

When it is desired to preserve the vaccine product by desiccation thereof, it is preferred to add a stabilizer, such as sterile skim milk or reconstituted non-fat dry milk solids, to the vaccine concentrate prior to freeze-drying thereof. In accordance with a further embodiment of the invention, it has been found that unexpected increased stability is obtained by employing a stabilizer of the following composition.

| Ingredient: | Percent by weight |
|---|---|
| Potassium citrate monohydrate | 0.135 |
| Sodium citrate | 0.245 |
| Dipotassium acid phosphate | 0.061 |
| Calcium chloride | 0.133 |
| Magnesium chloride hexahydrate | 0.06 |
| Potassium carbonate sesquihydrate | 0.1 |
| Lactose | 17.25 |
| Water to make 100.00. | |

The pH of the foregoing composition, hereinafter referred to as citrate-lactose stabilizer, was adjusted to 7, with lactic acid and the solution sterilized by filtration before use.

The citrate-lactose stabilizer has also been found to be remarkably effective in the stabilization of liquid vaccines. Said stabilizer further appears to be safe for injections into cattle in the amounts employed in normal dosages of vaccine.

The following examples illustrate improvement in stability of liquid vaccine obtained with the citrate-lactose stabilizer described above, and also the increased stability of vaccines prepared in accordance with the present invention as compared with vaccines prepared by the culture of the organisms on potato-glycerol agar using non-fat dry milk solids as stabilizer.

*Example 2*

A production lot of vaccine concentrate, prepared by the method of Example 1, was divided into two batches and each batch diluted sufficiently to produce an injectable vaccine containing a suitable concentration of Brucella organisms. One such batch was diluted with sterile, phosphate-buffered, physiological saline solution at pH 6.4 in conventional fashion. The other batch was diluted with sterile citrate-lactose stabilizer as described above. Portions of each batch were assayed by serial dilution and plating in the usual manner to determine the concentration of variable Brucella organisms in each batch as diluted. The batches were then maintained in closed containers at a temperature of 5° C. for six months and again assayed as before. The results are summarized in the following table, wherein the assays are in terms of billions ($10^9$) of organisms per milliliter.

| Diluent employed | Viable *Br. abortus* organisms/ml. ($\times 10^9$) | |
|---|---|---|
| | At preparation | After 6 months |
| Phosphate-buffered saline | 12.9 | 6.2 |
| Citrate-lactose stabilizer | 14.5 | 13.9 |

It will be noted that the vaccine prepared in conventional fashion with phosphate-buffered saline shows a loss during the storage period of over 50 percent in the number of viable organisms per milliliter, while the vaccine stabilized in accordance with the present invention decreased only about 4 percent in titer.

*Example 3*

*Brucella abortus* strain 19 organisms from a vigorous stock culture were seeded onto conventional solid potato-glycerol agar medium, incubated and harvested by washing with buffered saline solution according to the standard procedure of the prior art for production of a vaccine concentrate. Two batches of vaccine concentrate so prepared were diluted with reconstituted non-fat dry milk solution (a widely-used stabilizer) and physiological saline solution in the following proportions.

| Ingredient: | Percent by weight |
|---|---|
| Vaccine concentrate | 40 |
| Saline solution | 16 |
| Milk solution [1] | 44 |

[1] A sterile solution containing 92.6 grams of Starlac brand non-fat dry milk solids per liter.

Further batches of vaccine concentrate were prepared in liquid medium exactly as in Example 1. Two batches of such concentrates were diluted with physiological saline solution and reconstituted non-fat dry milk solution exactly as with the concentrates harvested from solid medium above. Two further such batches of concentrates produced in liquid media were diluted with the citrate-lactose stabilizer described above.

All batches of stabilized vaccines prepared as above were divided into standard dosage volumes and the latter bottled and freeze-dried in commercial equipment. After desiccation, representative samples of each batch of vaccine were reconstituted, serially diluted and plated by standard procedure to determine the concentration of viable organisms in each batch. The bottled, desiccated vaccines were then placed in an incubator maintained at 37° C. Such vaccines are normally kept refrigerated until reconstituted for use. Thus, particularly with a living vaccine such as is here involved, storage at 37° C. constitutes a severely accelerated test of stability. Representative samples from each batch of vaccine were removed from the incubator after storage intervals of 5, 10 and 20 days and reconstituted and assayed as before. The results are summarized in the following table, wherein the figures represent billions of visable Brucella organisms per milliliter of reconstituted vaccine.

| Nutrient medium | Stabilizer | Viable *Brucella abortus* organisms (bil./ml.) at indicated time interval after desiccation | | | |
|---|---|---|---|---|---|
| | | Initial | 5 days | 10 days | 20 days |
| Solid, potato agar | Non-fat milk | 16.2 | 12.5 | 6.0 | 0.3 |
| Do | do | 14.3 | 12.5 | 6.0 | 0.3 |
| Liquid, as in Ex. 1 | do | 16.9 | 14.2 | 10.5 | 6.3 |
| Do | do | 24.1 | 19.7 | 8.3 | 7.2 |
| Do | Citrate-lactose | 19.9 | 16.5 | 14.8 | 9.0 |
| Do | do | 21.6 | 17.8 | 15.3 | 12.5 |

The "Initial" figures in the preceding table are the values for the samples reconstituted and assayed immediately after desiccation. The results show not only the increased stability of vaccines stabilized with the citrate-lactose stabilizer, but also the increased stability of the vaccine produced by the liquid medium process of the present invention when stabilized with nonfat milk in comparison with similarly stabilized vaccine produced by the accepted prior art method of culturing on solid potato agar.

The vigorous growth of the organisms and lack of dissociation thereof in the liquid nutrient medium process of the invention makes said process adaptable as a continuous or semicontinuous process. In such a process, a portion of the liquid culture is withdrawn from the fermentor prior to completion of the production of the vaccine concentrate and while the organisms are reproducing vigorously at a logarithmically increasing rate of growth. Said portion is then employed as the inoculum seed in a further fresh volume of the liquid nutrient medium and the further culture of the organisms is continued as before for as many cycles as desired.

I claim:

1. The method for producing a vaccine concentrate of *Brucella abortus* organisms which comprises preparing a sterile liquid nutrient medium consisting of an aqueous solution of yeast extract, sodium chloride, thiamine hydrochloride, a polypropylene glycol having a molecular weight of from about 1500 to 3000 as an antifoaming agent 2 percent by weight of glucose and about 3 percent by weight of a pancreatic enzyme hydrolysate of casein, seeding said solution with a suspension of organisms of strain 19 of *Brucella abortus*, agitating the resulting mixture and maintaining same at temperatures of 36°–38° C., while introducing sterile air below the surface of said mixture at the rate of at least 7 volumes of air per minute for each 10 volumes of liquid culture medium, maintaining the foregoing incubation conditions for a period of from about 20 to 40 hours and harvesting the resulting vaccine concentrate.

2. A method according to claim 1 wherein the medium has the following composition:

| Ingredient: | Percent by weight |
|---|---|
| Pancreatic hydrolysate of casein | 3 |
| Glucose | 2 |
| Thiamine hydrochloride | 0.0005 |
| Yeast extract | 1 |
| Sodium chloride | 0.5 |
| Polypropylene glycol (molecular weight: 2000) | 0.0116 |
| Demineralized water to make 100.00. | |

3. A method according to claim 1 wherein the inoculum of Brucella organisms is introduced into a volume of the nutrient medium in an amount to provide from about $0.6 \times 10^9$ to $1.5 \times 19^9$ viable Brucella organisms per milliliter in the resulting mixture, said mixture is incubated in accordance with the method of claim 1 for a preliminary period of about 20 hours, a further volume, at least equal to the amount of the initial nutrient medium employed, of fresh, sterile nutrient medium is introduced and incubation continued in the same fashion for a further period of from about 15 to 20 hours to complete the production of the desired vaccine concentrate.

4. A method according to claim 1 wherein the vaccine concentrate product is mixed with a stabilizer consisting essentially of an aqueous solution containing in parts by weight 135 parts potassium citrate monohydrate, 245 parts sodium citrate, 61 parts dipotassium acid phosphate, 133 parts calcium chloride, 60 parts magnesium chloride hexahydrate, 100 parts potassium carbonate sesquihydrate and 17,250 parts lactose per 100,000 parts of water.

5. A stabilized vaccine prepared by the method of claim 4.

6. A method according to claim 4 wherein the stabilized vaccine product is freeze-dried.

References Cited by the Examiner

UNITED STATES PATENTS 2,682,492  6/54  Huddleson _____ 167—78

OTHER REFERENCES

Von Drummelen: Nature, June 4, 1955.
Technical Manual of the American Assoc. of Textile Chemists and Colorists, vol. XXXV, 1959, p. 538.
Gee et al.: J. Bact., 1946, vol. 52, pp. 261–281.
Gerhardt: J. Bact., 1946, pp. 283–292.
McCullough: J. Bact., 1947, pp. 5–15.
Heckly: Applied Microbiology, January 1960, pp. 52–54.

LEWIS GOTTS, *Primary Examiner*.

M. O. WOLK, IRVING MARCUS, *Examiners*.